Patented Sept. 18, 1934

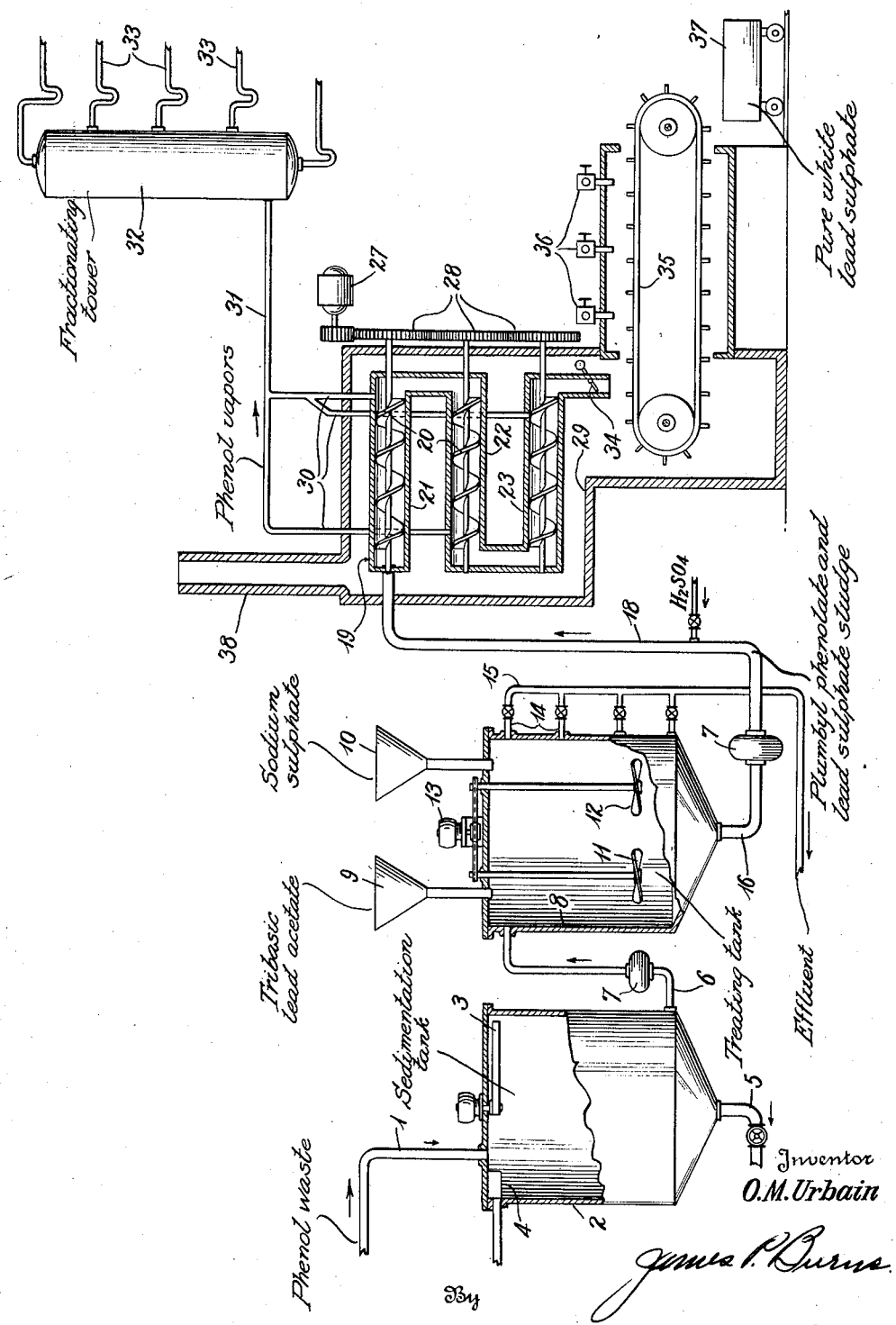

1,974,000

UNITED STATES PATENT OFFICE 1,974,000

PROCESS FOR PURIFYING PHENOLIC LIQUORS AND RECOVERING VALUES THEREFROM

Oliver M. Urbain, Columbus, Ohio, assignor to Charles H. Lewis, Harpster, Ohio

Application June 6, 1932, Serial No. 615,745

4 Claims. (Cl. 260—154)

The present invention relates to the purification of phenolic liquors and comprehends the provision of a process for purifying phenolic liquors and recovering values therefrom.

Waste phenolic liquors are discharged from many manufacturing processes, for example, from the paint, varnish and lacquer industries, solvents industries, and the manufacture of producer gas and coke. Some of these wastes are highly charged with phenols containing as much as 15%. The wastes from the manufacture of producer gas and coke are very high in phenols. When such wastes are discharged into public water courses the receiving waters are practically ruined as the purification of such waters for municipal purposes is a difficult and most expensive procedure. The discharge of such wastes without the recovery of the phenols represents a distinct economic loss as the phenols are quite valuable and in great demand in some industries.

There are now in use a number of processes for handling such wastes none of which are, however, economically successful, that is none of them show a profit on the purification and recovery balance. As it is necessary that the phenols be eliminated before the discharge of the heavy phenolic liquors, such prior art processes are in use because no better processes have been heretofore developed. Some of the processes now in use make no recovery and are as a result very expensive procedures.

The present invention contemplates a process for treating phenolic wastes whereby all the phenols are precipitated from the waste as insoluble compounds, and completely recovered from the precipitate in addition to the recovery of other valuable products, the total value of which is in excess of the total cost of the process of purification and recovery. The process comprehends the treatment of the phenolic waste with tribasic lead acetate, which reacts readily and quantatively with the phenols forming plumbyl phenolates, which in turn are treated with sulfuric acid yielding the pure phenols and lead sulfate, both of which are products used extensively in many of the arts.

The reagent employed in the process, namely, tribasic lead acetate, has the formula $Pb(C_2H_3O_2)_2—2PbO.H_2O$. It is soluble 5.55 parts in 100 parts of cold water and 18.2 parts in 100 parts of hot water. It may be prepared in two ways, first, by the action of acetic acid on lead oxide, the reaction being as follows:—

$2H—C_2H_3O_2+3PbO+H_2O=$
   $Pb(C_2H_3O_2)_2—2PbO.H_2O$

If prepared in the above manner, 120 units of acetic acid reacts with 669 units of lead oxide to make 808 units of tribasic lead acetate, a unit being any given unit of weight.

The second method of preparation consists in treating a solution of lead acetate with ammonium hydroxide in the proper proportions. The reaction is as follows:—

$3Pb(C_2H_3O_2)_2.3H_2O+4NH_4OH=$
   $Pb(C_2H_3O_2)_2—2PbO.H_2O+4NH_4C_2H_3O_2+9H_2O$

When the reagent is prepared by this latter method 140 units of ammonium hydroxide reacts with 1138 units of lead acetate. As an example of the procedure in accordance with the last method, 1 kilogram of lead acetate may be dissolved in 14 liters of cold water and 250 ml. of ammonium hydroxide (28 to 29% $NH_3$) is added with stirring. The solution will contain 710 grams of tribasic lead acetate. If the reagent is prepared in hot or warm water, the volume of water employed can be reduced in proportion to the solubility of the tribasic lead acetate in the water at the temperature employed. For instance, if hot water is used, only 4.3 liters of water need be employed.

When the reagent is prepared by the first procedure above outlined, the cost per pound based on present market quotations will be around $0.058. When prepared using the second procedure, detailed, the cost will be approximately $0.15. The reagent is more quickly prepared by the second procedure but, as noted, is much more expensive. Economy dictates that the reagent be prepared by the first method especially when the phenolic contents of the waste is very high and the recovery of values of major importance. When the waste contains relatively small quantities of phenols and the purification of the waste is of major importance, the reagent may be prepared by the second method if desired. The second method has the advantage that when used it is only necessary to withdraw a quantity of the waste sufficient to dissolve the quantity of tribasic lead acetate necessary to react with the phenols present in the parent body of the waste, and add the required amounts of lead acetate and ammonium hydroxide, stir, and return to the parent body of the waste.

Tribasic lead acetate reacts with all the phenols forming dense white precipitates of plumbyl phenolates. An example of the reaction using monohydroxybenzene is as follows:—

$Pb(C_2H_3O_2)_2—2PbO.H_2O+2C_6H_5OH=$
   $2PbO—C_6H_5OH+Pb(C_2H_3O_2)_2+2H_2O$

In the above reaction 808 units of tribasic lead acetate reacts with 188 units of phenol forming 634 units of plumbyl phenolate and 325 units of lead acetate. Lead acetate is always a product of the reaction between tribasic lead acetate and the phenols, and as it is very soluble, it is always found in the effluent. In general it can be said that the presence of lead acetate in the effluent will be objectionable; therefore, it should be eliminated. To eliminate the lead acetate it is only necessary to add to the solution sodium sulfate in gram molecular equivalents, lead sulfate which is insoluble is precipitated and sodium acetate which is not objectionable remains in solution. The reaction is as follows:—

$$Pb(C_2H_3O_2)_2 + Na_2SO_4 = PbSO_4 + 2NaC_2H_3O_2.$$

As shown by the reaction, 325 units of lead acetate reacts with 142 units of sodium sulfate forming 303 units of lead sulfate. In addition to the reasons given for eliminating the lead acetate this procedure is also desirable from an economic standpoint for lead sulfate is quite valuable, being worth about $130 per ton in the present market. Sodium sulfate is now worth only about $38 per ton. For each pound of sodium sulfate used we recover 2.14 pounds of lead sulfate, which indicates the economic desirability of this step of the process.

The sludge from the purification step of the process contains all the phenols originally in the waste in the form of plumbyl phenolates. The sludge will also contain other impurities originally in the waste such as suspended tars, which existed in such fine suspension that they were not removed by sedimentation. To recover the phenols from this mass the wet sludge is treated with sulfuric acid (66°). The reaction between the plumbyl phenolate and the sulfuric acid is shown as follows:—

$$PbO\!-\!C_6H_5OH + H_2SO_4 = C_6H_5OH + PbSO_4 + H_2O$$

As shown by the reaction, phenol is released and lead sulfate is formed. If a temperature of from 180° F. to 290° F. is applied the phenols may be volatilized, condensed and recovered. After the distillation of the phenols is completed, the residue is dried and ignited at a dull red heat (400 to 600 degrees centigrade) to destroy the organic matter contaminating the lead sulfate. The product of the ignition is a very pure white lead sulfate.

The amount of sulfuric acid to employ may be calculated by means of the reaction given above. According to the reaction 98 units of sulfuric acid reacts with 317 units of plumbyl phenolate or 31 pounds of sulfuric acid for each 100 pounds plumbyl phenolate.

In order to detail the operation of the process, the following example is given.

Assuming that a producer gas plant is discharging 10,000 gallons of scrubber liquor per day and that the liquor contains 5% phenol by weight, that the liquor has a specific gravity of 1.3, and it is desired to eliminate all phenols from this liquor and recover the same in a marketable condition as well as the other by-products which it is possible to recover. Since water weighs 8.34 pounds per gallon, the 10,000 gallons of scrubber liquor will weigh about 108,420 pounds and contain approximately 5,421 pounds of phenol.

An illustrative form of apparatus suitable for carrying out the process on such a scale is shown, partly in section, in the accompanying drawing.

Describing the operation in connection with the illustrated apparatus, the phenolic waste is supplied to the plant through line 1 whence it is delivered to sedimentation tank 2 having, for example, a 10,000 gallon capacity and providing a 12 hour sedimentation period for removal of suspended solids. The lighter oils and tars collect on the surface in tank 2 and are removed by the mechanical skimmer 3 which forces the oils through the openings 4 in the wall of tank 2. The sediment may be taken off from the bottom of tank 1 through line 5 while the phenolic waste passes from tank 1 through line 6 by a suitable pump 7 to the treating tank 8 which may be generally similar to tank 2.

In tank 8 the chemicals are added to the waste through suitable hopper feeders 9 and 10. Agitation is procured though the medium of agitators 11 and 12 driven by motor 13.

The 10,000 gallons of phenolic waste which is delivered to the tank 8 contains about 5,421 pounds of phenol. As above noted, it requires 808 units of tribasic lead acetate to react with 188 units of phenol. Therefore, there is added to the waste $$\frac{808}{188} \times 5{,}421 = 23{,}300$$

pounds of tribasic lead acetate. During this reaction, there is formed $$\frac{325}{188} \times 5{,}421 = 9372$$

pounds of lead acetate. It is desirable to recover the lead as lead sulfate and for this purpose sodium sulfate is used. Since 142 units of sodium sulfate react quantatively with 325 units of lead acetate, there will be required, $$\frac{9372}{325} \times 142 = 4095$$

pounds of sodium sulfate to eliminate the lead acetate. The sodium sulfate is best added in solution, the solution agitated, and then permitted to remain quiescent for a period of about 2 hours. The effluent is drawn off and discharged free of all phenols and clarified. The sludge contains $$\frac{634}{188} \times 5{,}421 = 18{,}282$$

pounds of plumbyl phenolate, and $$\frac{9372}{325} \times 303 = 8737$$

pounds of lead sulfate, both of which can be recovered.

The effluent leaves tank 8 through valve controlled vertically spaced draw-off lines 14 which lead to the manifold draw-off line 15.

The wet sludge discharges from the bottom of tank 8 through line 16 and is fed by pump 17 and line 18 into the retort 19. The H₂SO₄ can be fed into the sludge moving through the line 18.

The retort 19 takes the form of a continuous passageway made up of the horizontal sections 21, 22 and 23 connected in series by vertical sections 24 and 25. Power driven screw propellers 26 are positioned in horizontal sections 21, 22 and 23 to advance the sludge through the retort. The screws 26 are suitably driven by motor 27 and gear train 28. The retort 19 is heated by furnace 29. Each of the retort sections 21, 22 and 23 is provided with a vapor outlet line 30 which lines combine in a common vapor line 31 and the latter conveys the vapors into the fractionating tower 32. In the tower 32 controlled fractionation of the phenol vapors occurs and the condensates are removed through the several draw-off lines 33.

With reference to the addition of H₂SO₄ to the wet sludge, an amount sufficient to react quantatively with all the plumbyl phenolate present in the sludge, which in the illustrative case amounts to 18,282 pounds. It was noted previously that 98 units of sulfuric acid was required to react quantatively with 317 units of plumbyl phenolate and that as a result of the reaction there was released 94 units of phenol and there was also formed 303 units of lead sulfate. Since there is in the sludge 18,282 pounds of plumbyl phenolate, it will require $$\frac{18.282}{317} \times 98 = 5652$$

pounds of sulfuric acid. There will be freed as a result of the reaction $$\frac{94}{317} \times 18,282 = 5,421$$

pounds of phenol. There will be formed also $$\frac{18,282}{317} \times 303 = 17,475$$

pounds of lead sulfate which in addition to 8737 pounds of lead sulfate already contained in the sludge as a result of the elimination of the by-product lead acetate makes a total of approximately 26,212 pounds of lead sulfate present.

After the phenols have been driven off from the sludge as it passes through retort 19 the residual lead sulfate is discharged through valve 34 which operates automatically in response to pressure exerted thereon by the sludge. From valve 34 residual lead sulfate drops onto conveyor 35 and is next subjected to ignition at from 400 to 600° C. as it is conveyed under burners 36. This frees the residue of organic matter and leaves a pure white lead sulfate which is discharged from the conveyor into a suitable receptacle 37 beyond the furnace wall. The heating gases pass about the conveyor 35 and are thence passed about retort 19 to effect the evaporation of the phenol content of the sludge. The heating gases leave the furnace through stack 38.

The rate of feed through the retort 19 can be so adjusted as to insure a complete evaporation of the phenol content of the sludge with the application of moderate temperatures.

From the foregoing it will be seen that very substantial recoveries of phenol and lead sulfate are effected with resultant profit in the operation of the process.

The foregoing description is merely illustrative of the invention which is comprehended by the appended claims.

Having thus described my invention, what I claim is:—

1. A process for purifying phenolic liquors and recovering values therefrom comprising treating the phenolic liquor with tribasic lead acetate to precipitate plumbyl phenolates, then treating the precipitate with sulphuric acid to release phenol and form lead sulfate, subjecting the treated precipitate to heat adequate to distil off the phenol content from the treated precipitate and recovering the phenol thus distilled off.

2. A process for purifying phenolic liquors and recovering values therefrom comprising treating the phenolic liquor with tribasic lead acetate to precipitate plumbyl phenolates, and then treating the precipitate with sulphuric acid to release phenol and form lead sulfate.

3. In a process for removing phenols from phenolic wastes, the step of subjecting the waste to the action of tribasic lead acetate.

4. In a process for removing and recovering phenols from phenolic wastes, the steps of effecting a reaction of the phenols with tribasic lead acetate, subjecting the insoluble reaction product to the action of sulphuric acid and recovering the phenols released by the last reaction.

OLIVER M. URBAIN.